Patented Nov. 12, 1935

2,020,994

UNITED STATES PATENT OFFICE 2,020,994

MANUFACTURE OF GOODS OF OR CONTAINING SPONGE-LIKE OR CELLULAR RUBBER

Wilfred Henry Chapman, Stechford, Birmingham, Eric William Bower Owen, Erdington, Birmingham, and Donald Whitworth Pounder, Moseley, Birmingham, England, assignors to Dunlop Rubber Company Limited, London, England, a British company No Drawing. Application December 27, 1934, Serial No. 759,370. In Great Britain January 11, 1934

6 Claims. (Cl. 18—53)

This invention comprises improvements in or relating to the manufacture of goods of or containing sponge-like or cellular rubber or similar material of the kinds hereinafter specified.

Processes have already been proposed for the manufacture of goods of rubber or similar material of sponge-like or cellular structure from aqueous dispersions of rubber or the like by converting the aforesaid dispersions into a frothy condition wherein the froth comprises a gas and the emulsions or dispersions aforesaid still in the reversible condition and thereafter causing the frothy mass to set to a permanent structure of irreversible solid material. In such processes aqueous dispersions of rubber or the like can be employed which are or have been rendered capable of gelling on the application of heat or to which substances have been added to cause the dispersions to gel in the cold after a definite and controllable time interval.

The main object of the present invention is to produce goods of rubber or similar material of sponge-like or cellular structure of reduced volume density.

According to the present invention the process for the manufacture of goods of rubber or similar material of sponge-like or similar structure from aqueous dispersions of the kinds hereinafter specified wherein the aforesaid dispersions are converted into a frothy condition wherein the froth comprises a gas and the dispersions aforesaid still in the reversible condition and subsequently causing or allowing the frothy mass to coagulate or set to the permanent structure of irreversible solid material is characterized in that prior to, concurrent with or immediately after the coagulating or setting of the aforesaid dispersions, the uncoagulated or coagulated mass, as the case may be, is subjected to reduced pressure.

In accordance with the present invention light cellular structures of rubber can be produced for instance by either frothing the aqueous dispersions aforesaid under pressure and then releasing the pressure or by frothing the dispersions aforesaid under normal atmospheric conditions and then subjecting the frothed dispersions to reduced pressure.

For example, a mould can be partially filled with a frothed sensitized latex mixing and the mixing subjected to reduced pressure during or immediately after gelling. By partially filling a mould with an appropriate amount of frothed sensitized latex and placing the mould in a vessel in which the pressure is gradually reduced, the froth is caused to expand and fill the mould. After the froth has set the pressure can be gradually increased to atmospheric. Vulcanizing, drying and any other subsequent operations can then be carried out in the usual way.

It is usually desirable to add froth-forming or lather-forming substances to the aqueous dispersions aforesaid if such substances are not already present in sufficient amounts. Examples of such froth-forming or lather-forming substances are soap, soap-forming ingredients or saponin.

When heat is employed to convert the foam or froth produced to a solid or sponge-like structure the temperature should not be so high as to cause break-down in the cell structure, for example the temperature should not be above the boiling point of water.

The emulsions or dispersions comprise by way of example, those consisting of or containing rubber, gutta-percha, balata or similar vegetable resins, occurring naturally or artificially obtained and in vulcanized or unvulcanized condition. Aqueous dispersions of coagulated rubber, vulcanized rubber, synthetic rubber, waste or reclaim, may also be employed if desired, as alternatives or admixtures. Any of the aforesaid dispersions may contain the usual known compounding ingredients. Concentrates such as are obtained in Patent Number 1,846,164 to which may be added any one or more of the usual compounding ingredients, preferably excepting those which would tend to form insoluble soaps or to increase the surface tension of the foamy mass may also be used.

What we claim is:

1. A process of manufacturing rubber goods of cellular or foam structure which comprises, forming a foam of an aqueous dispersion of rubber and after the formation of said foam decreasing the pressure surrounding said foam below the pressure within the cells thereof to expand said cells, and vulcanizing the expanded structure.

2. The process of claim 1 in which said froth is set after said decrease in pressure and expansion of said cells.

3. The process of claim 1 in which said froth is set before said decrease in pressure and said expansion of cells.

4. The process of claim 1 in which said foam is formed under a super atmospheric pressure.

5. The process of claim 1 in which said expansion of cells takes place to a pressure less than atmospheric.

6. A process of manufacturing rubber goods of cellular or foam structure which comprises forming a foam of an aqueous dispersion of rubber, partly filling a mold with said foam, thereafter decreasing the pressure surrounding said foam until the pressure within said cells thereof expands the cells until said mold is completely filled, and vulcanizing the expanded structure.

WILFRED HENRY CHAPMAN.
ERIC WILLIAM BOWER OWEN.
DONALD WHITWORTH POUNDER.